United States Patent
Paulson

(10) Patent No.: US 7,857,339 B2
(45) Date of Patent: Dec. 28, 2010

(54) BRAKING SYSTEMS

(75) Inventor: William Charles Paulson, Tetbury (GB)

(73) Assignee: Sentinel Systems Limited, Tetbury (GB)

( * ) Notice: Subject to any disclaimer, the term of this patent is extended or adjusted under 35 U.S.C. 154(b) by 351 days.

(21) Appl. No.: 12/091,241

(22) PCT Filed: Oct. 24, 2006

(86) PCT No.: PCT/GB2006/003968

§ 371 (c)(1),
(2), (4) Date: Apr. 23, 2008

(87) PCT Pub. No.: WO2007/049033

PCT Pub. Date: May 3, 2007

(65) Prior Publication Data

US 2008/0245597 A1    Oct. 9, 2008

(30) Foreign Application Priority Data

Oct. 24, 2005  (GB) ................... 0521617.1
Jan. 24, 2006  (GB) ................... 0601436.9

(51) Int. Cl.
B60K 28/10 (2006.01)
B60T 7/12 (2006.01)

(52) U.S. Cl. .................. 280/275; 280/276; 280/277

(58) Field of Classification Search .................. 180/274, 180/275, 276, 277
See application file for complete search history.

(56) References Cited

U.S. PATENT DOCUMENTS

| | | | | |
|---|---|---|---|---|
| 4,146,107 A * | 3/1979 | Ebbeson et al. | ............. | 180/275 |
| 4,407,388 A * | 10/1983 | Steel | ............. | 180/271 |
| 4,574,908 A * | 3/1986 | Brick | ............. | 180/169 |
| 4,799,570 A * | 1/1989 | Andersson et al. | ............. | 180/275 |
| 4,893,691 A * | 1/1990 | Park | ............. | 180/169 |
| 4,964,485 A * | 10/1990 | Miele | ............. | 180/275 |
| 5,203,422 A | 4/1993 | Estep et al. | | |
| 6,193,332 B1 * | 2/2001 | Ono | ............. | 303/191 |
| 6,234,586 B1 * | 5/2001 | Davis et al. | ............. | 303/89 |
| 6,267,194 B1 * | 7/2001 | Bullinger et al. | ............. | 180/275 |
| 6,364,433 B1 * | 4/2002 | Stemer | ............. | 303/138 |
| 6,543,567 B2 * | 4/2003 | DeLuca et al. | ............. | 180/275 |
| 2004/0226768 A1 * | 11/2004 | DeLuca et al. | ............. | 180/275 |
| 2005/0017857 A1 | 1/2005 | Rao et al. | | |
| 2008/0023247 A1 * | 1/2008 | Hall | ............. | 180/274 |

FOREIGN PATENT DOCUMENTS

DE   19831262 A1   7/1998
EP   0298714      7/1988

* cited by examiner

Primary Examiner—Toan C To
(74) Attorney, Agent, or Firm—Polster, Lieder, Woodruff & Lucchesi, L.C.

(57) ABSTRACT

A reverse braking system for a commercial vehicle including sensors (102) for detecting an object in the path of the vehicle when reversing such that a park brake air supply (108) is connected to the brake chambers (111) to apply the brakes automatically when an object is detected. The brakes can only then be released when the vehicle parking brake has been applied.

14 Claims, 4 Drawing Sheets

BRAKING SYSTEMS

CROSS REFERENCE TO RELATED APPLICATIONS

The present application, as a National Stage filing, derives and claims priority from PCT/GB2006/003968 having an international filing date of Oct. 24, 2006, published as International Publication No. WO 2007/049033 A1, and from British Application Nos. GB 0521617.1, filed Oct. 24, 2005 and 0601436.9 filed Jan. 24, 2006, which are each herein incorporated by reference.

STATEMENT REGARDING FEDERALLY SPONSORED RESEARCH

Not Applicable.

BACKGROUND OF THE INVENTION

This invention relates to braking systems for commercial vehicles and particularly, but not exclusively, provides improvements in braking systems for use when the vehicle is reversing.

Systems are already known in which, when the vehicle is reversing, the brakes are applied automatically when an obstruction is detected in the path of the reversing vehicle.

In one arrangement, an obstruction is remotely detected by means of a proximity sensor that transmits a radio frequency signal to a cab-mounted receiver which generates an audible and/or visual signal that the vehicle is close to the object detected, which may be a person, another parked vehicle or another static obstruction.

In another arrangement, the brakes of a vehicle can be applied when an obstruction is detected, the brakes then being released after a pre-determined time or once the obstruction is removed or isolated. When the vehicle is an articulated lorry or truck comprising a tractor unit and a trailer, power for the activation system is generally supplied from the reversing light wiring on the trailer, whereby the system is armed whenever reverse gear is selected and the reversing light is on.

As described in GB2340902A, the electrical system on the trailer can include a battery back-up arrangement which supplies power to the activation system in the event that the electrical connections to the reversing lights are not in operation or otherwise disabled due to there being no electrical connection between tractor and trailer.

According to the arrangements described in GB2340902A, the battery back-up is activated by application of air pressure to release the park brake and supplies power to the emergency system when power from the tractor unit is isolated. When the tractor power supply is re-established, the battery of the battery back-up is recharged. However, there is a possibility that the back-up becomes activated unintentionally due, for example, to failure in an individual component which could result in activation of the armed system when travelling forward at speed.

Another system is also known to provide a brake application system which, when an obstruction is detected, will automatically apply the brakes and, after a pre-determined period of time, release the brakes to allow the reversing manoeuvre to continue. It is a feature of certain types of commercial vehicles, in particular buses and coaches when fitted with automatic gearboxes, that the gearboxes do not have a "park" selection mode to lock the transmission. They usually have only a forward, neutral and reverse gear selector.

In the know type of reversing system which applies the brakes for a pre-determined time, it could be dangerous if the know braking system was to become activated and the driver left his seat in order to investigate the reason for activation without deselecting reverse gear and applying the parking brake. After the pre-determined time had elapsed, the system would automatically release the brakes and, if reverse gear had not been de-selected, would allow the vehicle to continue reversing. This could cause an accident to happen which had been prevented in the first place by the automatic activation of the brakes for a pre-determined time.

BRIEF SUMMARY OF THE INVENTION

It is an object of the present invention to provide a braking system which mitigates some or all of the aforementioned problems.

It is a preferred object of the present invention to provide a braking system of the type as herein described, which can be used with the vehicles having automatic gearboxes without a "park" mode.

It is another preferred object of the present invention to provide a braking system of the type as herein described, which can be used with a tractor and trailer that reduces the risk of inadvertent activation.

In one aspect, the present invention provides a reverse braking system for a commercial vehicle and including sensor means for detecting an object in the path of the vehicle when reversing, means responsive to a signal transmitted by the sensor means for automatic application of the brakes when an object is detected, and means for release of the brakes following automatic application, in which the system further comprises means to determine the condition that reverse gear has been de-selected and the condition that the vehicle parking brake has been applied, said determination means being operatively connected to the brake release means to release the brakes only after the conditions are satisfied.

When equipped with a reverse braking system according to the invention, the brakes may only be released once the vehicle has been taken out of reverse gear, thus disarming the signal from the sensor means, and once the parking brake has been applied. Once these two conditions have been satisfied in combination, the vehicle not only may be left in a safe mode, for example by the driver leaving his seat before the brakes are released, but also the vehicle is prevented from movement should the driver need to vacate his seat to investigate the obstruction.

If a system for automatic brake application on detection of an obstruction is malfunctioning, the vehicle can be reversed but the system will not detect an objection or apply the brakes. Furthermore, the driver will be unaware of the malfunction.

In another aspect, therefore, the present invention provides a reverse braking system for a commercial vehicle in which the system further comprises a test means to subject the operative sensor, brake application and release means to a self-test protocol when reverse gear is selected.

Preferably, the self test system indicates to the driver, for example with a green light for 2 seconds, that the system is functioning correctly and with a constant flashing light if the system is malfunctioning.

The system incorporating the test protocol may be used in conjunction with the reverse braking system as hereinbefore described.

In yet a further aspect, the present invention provides a reverse braking system for a commercial vehicle including sensor means for detecting an object in the path of the vehicle when reversing, means responsive to a signal transmitted by the sensor means for automatic application of the brakes when an object is detected, and means for release of the brakes following automatic application, in which the system includes means to over-ride the automatic brake application means to allow reversing to continue under the direction of the driver of the vehicle.

In a still further aspect, the present invention provides a reverse emergency braking system for an articulated tractor and trailer, the system including sensor means for detecting an object in the path of the trailer when reversing and trailer-mounted means for automatic application of the brakes when an object is detected by the sensor means, the brake application means comprising a power-operated switch to actuate the brake operating mechanism and a trailer-mounted battery back-up system for supply of power to the switch, in which the tractor is provided with radio transmission means and the trailer is provided with radio receiving means, the receiving means being connected to the battery back-up system to activate the back-up system on receipt of a radio signal from the transmission means.

A system according to the invention is of especial use where the tractor is a shunting tractor used for manoeuvring trailers in a yard or, for example, in hauling them on or off ferries for subsequent onward transmission when connected to a road tractor. When a trailer is connected to a shunting tractor, it is common practice for only the emergency air line to be connected to the trailer, in order to release the parking brakes. There is generally no electric connection between the shunting tractor and the trailer and, as a result, the only source of power for the emergency braking system is the battery back-up which, according to the present invention, is activated on receipt of a radio signal transmitted by the transmission means on selection of reverse gear on the tractor. Additionally, road tractors are not normally equipped with radio transmitters, thus rendering the back-up system unusable when the trailer is connected to a road tractor.

The sensor means mounted on the trailer can be either a proximity sensor, such as an ultrasonic detector, or a physical sensor such as a resilient bumper strip which, on being compressed by contact with an object, activates the brakes as described in GB2340902A.

The power-operated switch which, in use, actuates the brake operating mechanism may act either to admit pressurised air to the service brake system, in order to apply the brakes, or to the parking brake system, to maintain the parking brakes in the off condition until such time as an object is detected by the sensor means, in which case the pressurised air is vented to atmosphere, so allowing the parking brakes automatically to be applied. In either event, the pressurised air is supplied via a shuttle valve the position of which is determined according to whether an object has been detected by the sensor means or not.

BRIEF DESCRIPTION OF THE SEVERAL VIEWS OF THE DRAWINGS

Embodiments of the invention will now be described by way of example with reference to the accompanying drawings, in which.

DETAILED DESCRIPTION OF THE INVENTION

Figure 1:
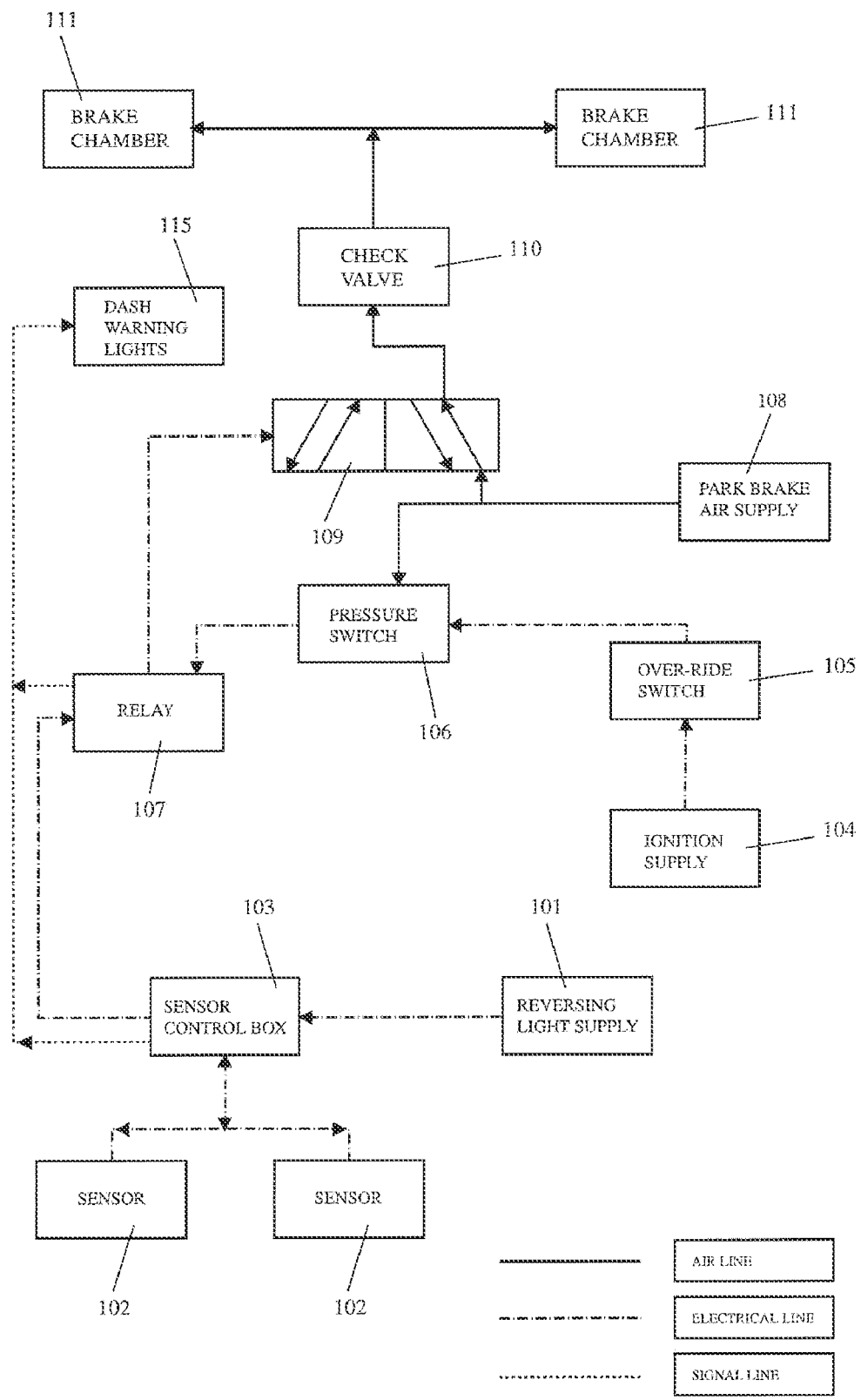
FIG. 1 is a schematic diagram of a safety braking system according to one aspect of the invention.

Referring firstly to FIG. 1, proximity sensors 102 are electrically connected to control box 103 which receives electrical power via the reversing light supply 101 when reverse gear is selected. When the ignition is switched on, at ignition supply switch 104, electrical power is provided via override switch 105 and pressure switch 106 to relay 107 incorporated in the main brake control box. The pressure switch 106 is provided by park brake air supply pressure from compressor 108, thus closing the pressure switch and providing power to the relay 107. The relay 107 is electrically connected to a solenoid valve 109 which is connected via check valve 110 to the brake chambers 111.

On engaging reverse gear the system carries out a self-check to confirm all parts of the system are working correctly. If the system is OK, a green light is illuminated on the dash for 2 seconds. If the system is faulty a continuous flashing red light is illuminated on the dash. The dash warning lights are indicated by reference 115 in FIG. 1.

In operation, with the ignition switched on, parking brake pressure provided by compressor 108 activates the pressure switch 106 to provide electrical power to the relay 107 and also passes though the solenoid valve 109 and check valve 110 to release the park brakes.

Reverse gear can then be selected by the driver; as the vehicle reverses, the proximity sensors 102 will detect an obstruction within, say, 1 meter of the rear of the vehicle, whereupon the sensor control box 103 sends an electrical signal to the brake control box, whereupon the relay 107 sends a signal to the solenoid valve 109 to move it to the left (as shown in the drawing), whereby the park brake air supply is isolated from the check valve, air is exhausted from the check valve and the brakes are automatically applied. The vehicle is thus rendered immobile until the brakes are released.

In order to release the brakes, the vehicle is taken out of reverse gear, thereby isolating the electrical supply to the sensor control box 103 and deactivating the proximity sensors 102. However, the brakes are still engaged and can only be released by the driver applying the park brake. Application of the park brake results in a lowering of park brake air supply pressure from the compressor 108, which cause pressure switch 106 to open which in turn deactivates the solenoid valve 109, causing it to release the latching mechanism and allow air to pass once again through the solenoid valve and to release the brakes. When the brakes are applied, a red warning light is illuminated on the dash to warn the driver as shown at 115. This light stays illuminated until the brakes are released.

Figure 2:
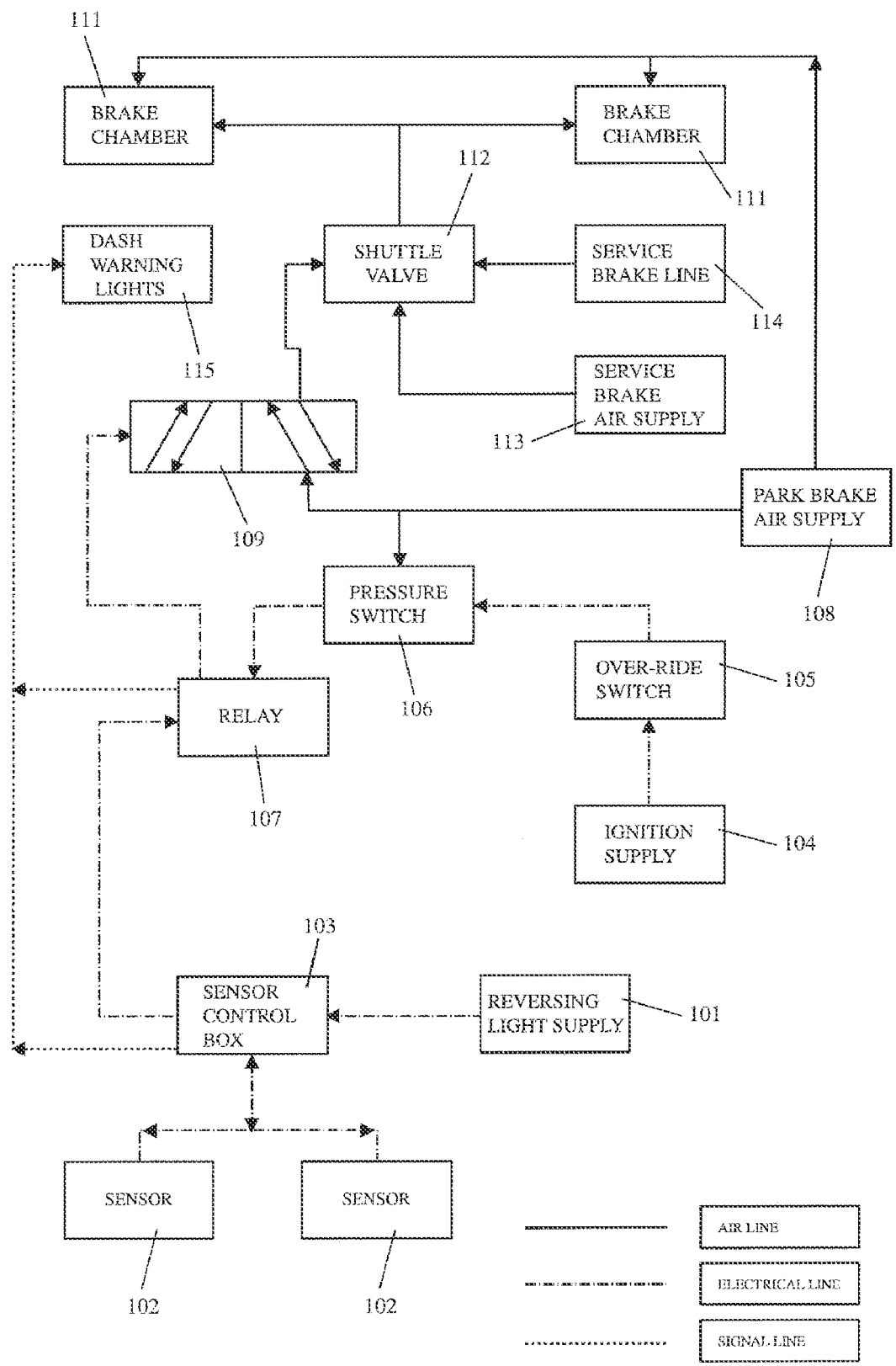
FIG. 2 is a schematic diagram of a system as shown in FIG. 1 incorporating service brake operation.

With reference now to FIG. 2, which shows an alternative service brake application, the system as already described with reference to FIG. 1 has the additional features of a shuttle valve 112 in place of the check valve 110, the shuttle valve 112 having an input from the service brake air supply 113 and service brake line 114.

In use, when the sensors detect an obstruction, a signal is sent through the sensor control box 103 to relay 107 which causes solenoid valve 109 to change position. Air then passes from the park brake air supply through the solenoid valve 109 to one side of the shuttle valve 112. This causes the shuttle valve 112 to change position and allow the service brake air supply 113 to flow through the shuttle valve 112 to the brake chambers 111 to apply the service brake. The means of resetting the system and releasing the brakes is exactly the same as described in FIG. 1. The system does not impede the safe operation of the service brake under the direct control of the driver.

In the embodiments as illustrated, the override switch 105 between the ignition supply 104 and pressure switch 106 is optional but, when present, allows the system to be manually deactivated so that, in an emergency, the vehicle can still be reversed.

As a further optional feature of the above-described embodiments, the sensor control box 103, including the proximity sensors 102, and the relay 107 mounted in the brake control box are connected to a self-test system which is activated when reverse gear is selected, with means 115 being provided in the driver's position to confirm that the system is functional or, on the other hand, to indicate a malfunction in the system.

For example, correct functioning may be indicated by display of a green light for a predetermined time and malfunctioning may be indicated by a flashing red light which continues to be displayed until the vehicle is taken out of reverse gear. When the system is activated and the brakes applied, a constant red light may be displayed until the brakes are released by correctly following the release protocol or by operation of the override switch.

Figure 3:
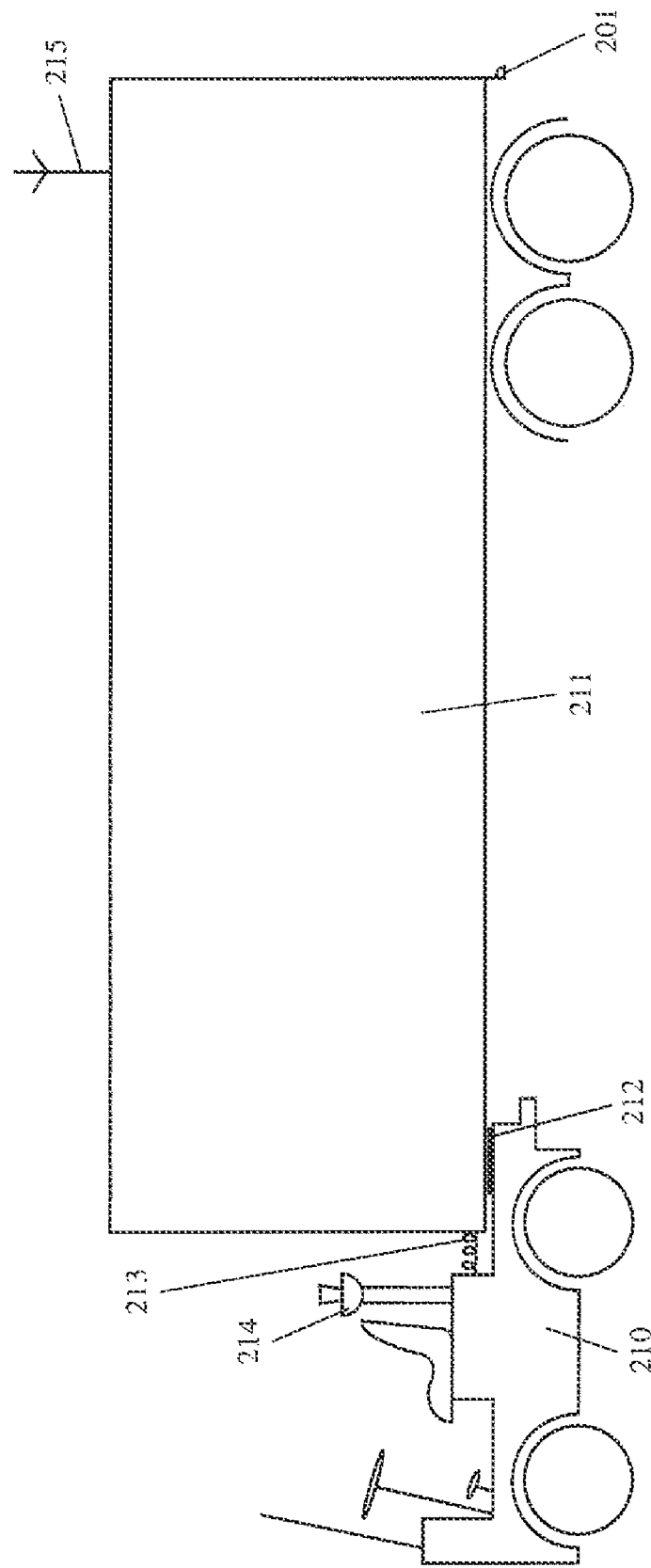
FIG. 3 is a diagrammatic view of an articulated tractor and half-trailer including a system according to another aspect of the invention.

With reference now to FIG. 3, a shunting tractor unit 210, as commonly seen manoeuvring trailers on and off ferries and parking them for subsequent connection and towing away by a road tractor, is articulatedly connected to a half-trailer 211 by a standard horseshoe-shaped coupling device 212 and is otherwise connected to the trailer only by means of an emergency air line 213. The tractor includes a radio transmitter 214 operatively connected to the gear selector mechanism such that a radio signal is emitted whenever reverse gear is selected.

The trailer 211 incorporates an emergency braking system as described in more detail with reference to FIG. 4 and carries an antenna 215 for receiving radio signals emitted by emitter 214 on the tractor.

Figure 4:
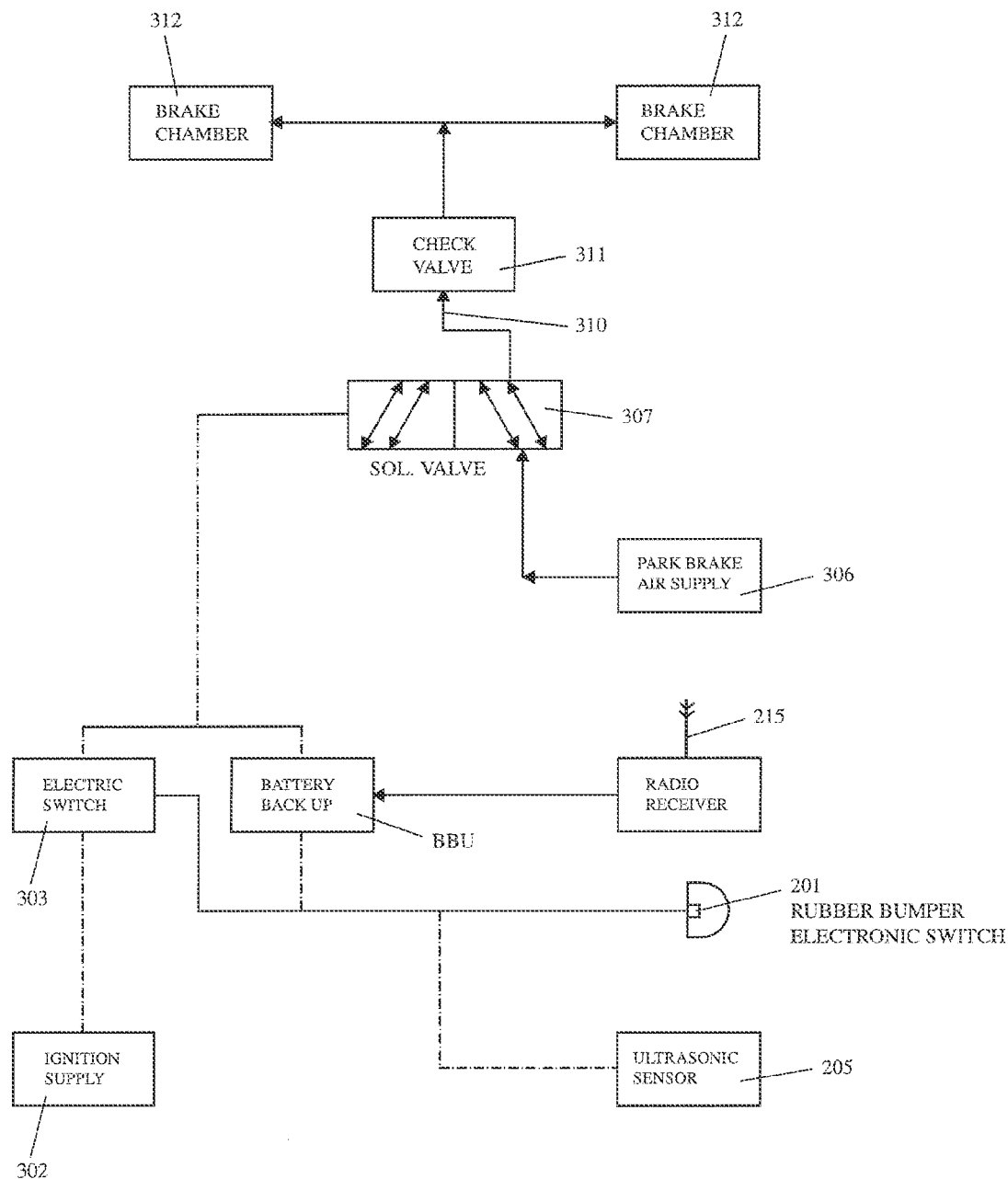
FIG. 4 is a block diagram showing the braking system of FIG. 3 as applied to the trailer.

With reference now to FIG. 4, the incoming air supply 306 normally operates through solenoid valve 307 and check valve 311 to keep the parking brakes released. When reverse gear is selected on the tractor, a radio signal transmitted by emitter 214 is received by radio receiving antenna 215 and activates a battery back-up for the purpose, when necessary, of actuating the solenoid valve 307 to cause the air supply to vent to atmosphere, whereby the parking brakes are automatically applied. This happens when an obstruction is detected in the path of the reversing trailer, for example by rubber bumper 201 carrying an electronic switch or, alternatively, by ultrasonic proximity sensor 205. When this is received, the battery back-up sends a signal to the solenoid valve 307 to cause the valve to move to vent the air supply causing the parking brakes to be applied automatically.

The ignition supply 302 and electric switch 303 are operative when the tractor is a road tractor or is otherwise electrically connected to the trailer, in addition to the air line. The emergency braking system is thus rendered operative for detecting obstructions in the reversing path of the trailer. The battery back-up is then not required and the battery is recharged from inbuilt recharging circuitry.

When the brakes have been applied on detection of an obstruction, either by pressurisation of the service brakes or venting pressure on the parking brakes, the brakes may subsequently be released either after elapse of a predetermined time period or after carrying out a prescribed safety protocol such as described in connection with the embodiments of FIGS. 1 and 2.

It will be understood that the invention is not limited to the embodiments above-described and that various modifications and changes can be made without departing from the principles and concepts described herein. For example, the sensor employed to detect an obstruction may be of any type suitable for the purpose including non-contact sensors such as ultrasonic sensors and contact sensors such as resilient bumpers or any other sensors as will be familiar to those skilled in the art. The number of sensors may be chosen according to the requirements of the system. Any suitable means of providing a visual and/or audible warning to the driver of the condition of the system may be employed.

Furthermore, it will be appreciated any features of the embodiments may be used separately or in combination with one or more features of any of the other embodiments to provide a braking system with the benefits and advantages of any of the different aspects of the invention described herein.

The invention claimed is:

1. A reverse braking system for a commercial vehicle including sensor means for detecting an object in the path of the vehicle when reversing, means responsive to a signal transmitted by the sensor means for automatic application of the brakes when an object is detected, and means for release of the brakes following automatic application, in which the system further comprises means to determine a first condition that a reverse gear has been de-selected and a second condition that a vehicle parking brake has been applied, said determination means being operatively connected to the brake release means to release the brakes only after the first and second conditions are satisfied.

2. A reverse braking system according to claim 1 wherein the signal from the sensor means is disarmed allowing the brakes to be released only when the vehicle has been taken out of reverse gear and the parking brake has been applied.

3. A reverse braking system according to claim 1 wherein the system further comprises a test means to subject the sensor means, brake application and release means to a self-test protocol when reverse gear is selected, whereby a means of warning the driver if any of said sensor means, brake application and release means is determined by the test means to be malfunctioning.

4. A reverse braking system according to claim 3 wherein, the self test system is configured to indicate to the driver that the system is functioning correctly.

5. A reverse braking system according to claim 3 wherein, the self test system is configured to indicate to the driver that the system is malfunctioning.

6. A reverse braking system according to claim 1 wherein the system includes means to over-ride the automatic brake application means to allow reversing to continue under the direction of the driver of the vehicle.

7. A reverse braking system according to claim 1 wherein the vehicle is an articulated tractor and trailer, the system including trailer-mounted means for automatic application of the brakes when an object is detected by the sensor means, the brake application means comprising a power-operated switch to actuate the brake operating mechanism and a trailer-mounted battery back-up system for supply of power to the switch, in which the tractor is provided with radio transmission means and the trailer is provided with radio receiving means, the receiving means being connected to the battery back-up system to activate the back-up system on receipt of a radio signal from the transmission means.

8. A reverse braking system according to claim 7 wherein the radio signal is transmitted when reverse gear is selected.

9. A reverse braking system according to claim 1 wherein the sensor means is a non-contact sensor.

10. A reverse braking system according to claim 1 wherein the sensor means is a contact sensor.

11. A reverse braking system according to claim 9 wherein said non-contact sensor is an ultrasonic detector.

12. A reverse braking system according to claim 10 wherein said contact sensor is a resilient bumper strip.

13. A reverse braking system for a commercial vehicle including sensor means for detecting an object in the path of the vehicle when reversing, means responsive to a signal transmitted by the sensor means for automatic application of the brakes when an object is detected, and means for release of the brakes following automatic application, in which the system includes means to over-ride the automatic brake application means to allow reversing to continue under the direction of the driver of the vehicle.

14. A reverse emergency braking system for an articulated tractor and trailer, the system including sensor means for detecting an object in the path of the trailer when reversing and trailer-mounted means for automatic application of the brakes when an object is detected by the sensor means, the brake application means comprising a power-operated switch to actuate the brake operating mechanism and a trailer-mounted battery back-up system for supply of power to the switch, in which the tractor is provided with radio transmission means and the trailer is provided with radio receiving means, the receiving means being connected to the battery back-up system to activate the back-up system on receipt of a radio signal from the transmission means.

* * * * *